(12) United States Patent
Chan

(10) Patent No.: US 6,212,054 B1
(45) Date of Patent: Apr. 3, 2001

(54) SPARK PROOF BOOSTER CABLE SYSTEM

(75) Inventor: Sing Chan, Pasadena, CA (US)

(73) Assignee: PowerPro Inc., Pasadena, CA (US)

( * ) Notice: Subject to any disclaimer, the term of this patent is extended or adjusted under 35 U.S.C. 154(b) by 0 days.

(21) Appl. No.: 09/399,867

(22) Filed: Sep. 21, 1999

(51) Int. Cl.[7] .................................................. H01H 47/00
(52) U.S. Cl. ......................... 361/170; 361/82; 307/10.7; 307/127; 320/105; 340/636
(58) Field of Search ........................... 361/82, 170, 187; 307/127, 9.1, 10.1, 10.7; 320/105; 324/426, 429, 435; 340/636

(56) References Cited

U.S. PATENT DOCUMENTS

| | | | |
|---|---|---|---|
| 4,180,746 | * 12/1979 | Giuffra | 307/127 |
| 4,349,774 | * 9/1982 | Farque | 320/105 |
| 4,366,430 | * 12/1982 | Wright | 320/105 |
| 4,400,658 | * 8/1983 | Yates | 320/105 |
| 4,420,212 | * 12/1983 | Wright | 439/490 |
| 4,701,688 | * 10/1987 | Guim | 320/105 |
| 5,183,407 | * 2/1993 | Srol | 439/135 |
| 5,796,255 | * 8/1998 | McGowan | 324/429 |

* cited by examiner

Primary Examiner—Michael J. Sherry
(74) Attorney, Agent, or Firm—Clement Cheng

(57) ABSTRACT

An apparatus that can be used to jump-start a car that has a weak battery. It includes a battery booster pack or a battery booster cable that is polarity sensitive and can detect proper and improper connections before providing path for electric current. This apparatus eliminates the danger of reverse connections, shorts, fires, spark firing and battery explosion. The apparatus requires no separate switching mechanism to turn power on or power off. It also does not require the imperfect human judgment of any indication device to determine correct or incorrect connection. The clamps detect for the correct polarity and automatically control the power. Power turns on once a good connection has been made. If user makes a wrong connection, there will be no power but its warning signal will go off. Once a clamp is dislodged from the battery terminal, it automatically turns power off without the need to deactivate a switch. This apparatus also provides safe and automatic power on/off control for the booster cable and booster pack.

8 Claims, 16 Drawing Sheets

SMART BOOSTER CABLE CONTROL BLOCK DIAGRAM

Normal working state

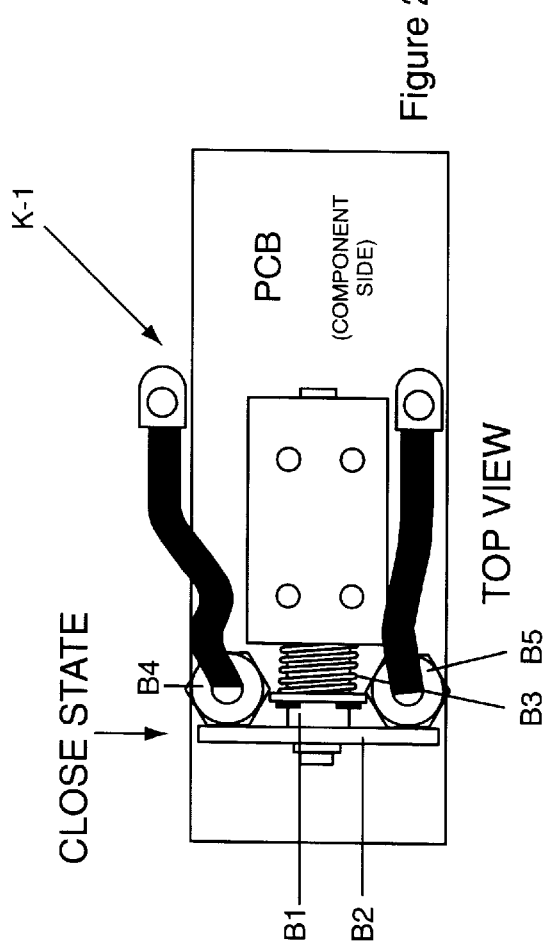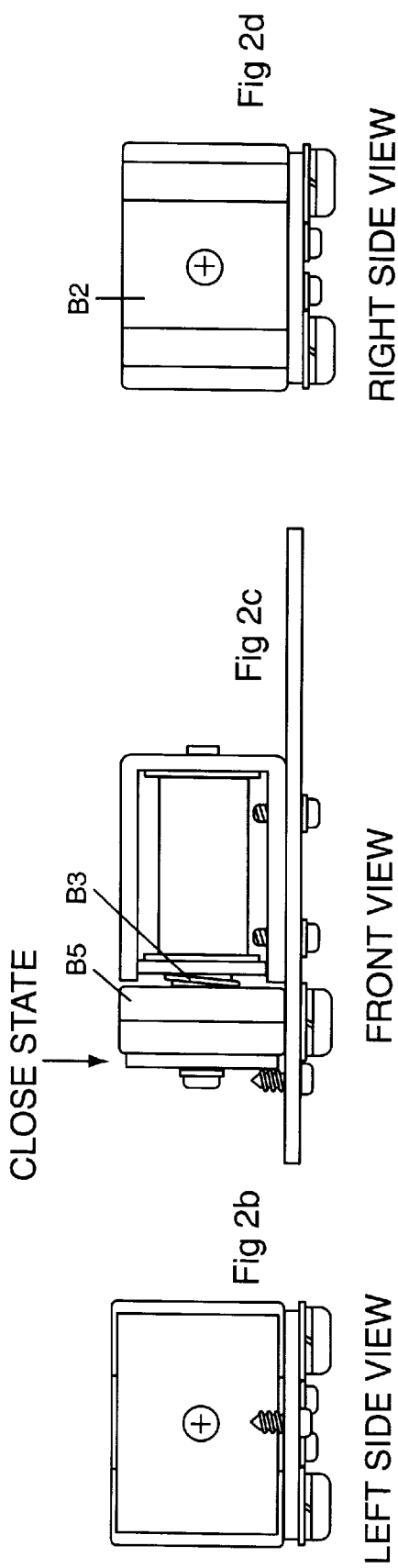

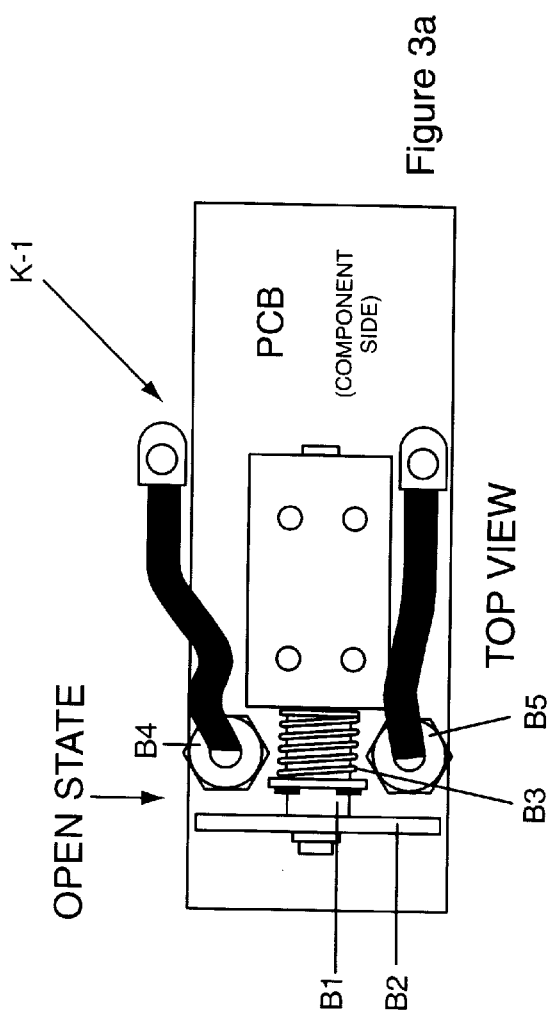
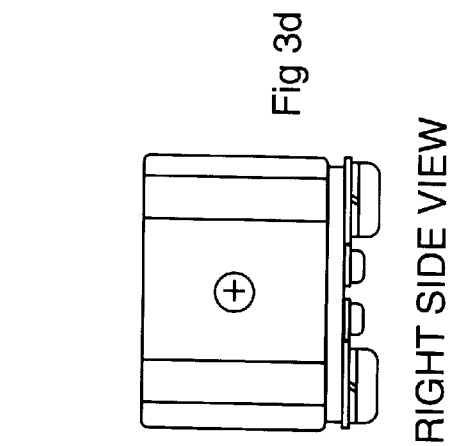
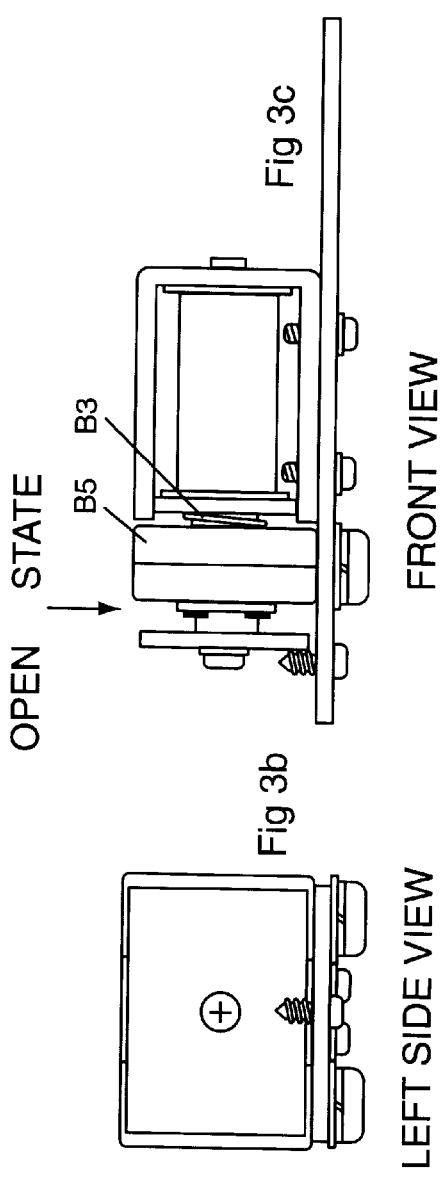

Normal working state

Reverse polarity state

Short circuit state

SMART BOOSTER CABLE INTERNAL CONNSTRUCTION

SMART BOOSTER CABLE INTERNAL CONNNSTRUCTION

US 6,212,054 B1

SPARK PROOF BOOSTER CABLE SYSTEM

BACKGROUND OF THE INVENTION

This invention pertains to a portable device that provides additional battery power for jump-starting stranded vehicles whose internal battery is discharged.

There are two types of existing products of similar function in the market:

A Booster Cable is a pair of parallel cables. Each end of the cable is attached to one pair of alligator clamps. The clamps are clamped on to the battery terminals so that electric current flows from a boosting battery to the discharged battery. This provides power to start the stranded vehicle.

A Booster Pack is a pair of cable connected at one end to the built-in battery of a portable box while the other end connected to a pair of alligator clamps. When the clamps are connected to a discharged battery, current flows from the built-in booster battery of the booster pack to the discharged battery of the stranded vehicle.

For booster cable sets and booster packs, it is important that user will makes the correct polarity connection between the clamps and the batteries. If the connection is reversed, firing sparks will discharge at the contact points and may cause damage to property or to people.

Traditionally, many inventors attempted to reduce or to eliminate the risk of reverse connections associated to the use of booster cable sets. In U.S. Pat. No. 4,366,430, Wright taught an art using a manual switch and a voltage detector in order to determine whether a connection was safely made. Further, in U.S. Pat. No. 4,420,212, Wright taught another art of using light emitting diodes ("LED") for indication of polarity of connection. Later, McGowan, in U.S. Pat. No. 5,796,255, disclosed another art of using LED art and voltage detection method to indicate and detect correct connection in using booster cable sets. These methods can detect an improper connection. Upon viewing the good connection, the user will press a switch to complete the electric path between the booster battery and the discharged battery.

The inventions require user to make judgment based on viewing the LED indication and then manually activate the switch to complete an electric path between the two batteries. Also, after the booster cable successfully jumped starting the stranded vehicle, the inventions require user to activate switch again to terminate the electric path. If a careless user forgets to press the switch after jump starting a stranded vehicle, the dislodged clamps may discharge firing sparks. The same peril exists when a second connection is made with reverse polarity.

Other inventors have attempted to reduce or to eliminate the spark risk when using booster packs. In U.S. Pat. No. 5,589,282, Roxon disclosed an invention providing a holster to house the permanently charged clamp of the booster pack. In this invention, the holster is permanently attached to the main portable enclosure body of the booster pack unit. In U.S. Pat. No. 5,183,407, Srol invented the use of an insulated cap to protect the charged clamp of the booster pack unit.

In these booster pack inventions, once the user dislodges the clamps from either the holster or the cap, the peril of an improper connection remains.

This invention solves all of the above problems of reverse connections, shorts, spark firing and battery explosion. The solution is provided below in the detailed description.

BRIEF SUMMARY OF THE INVENTION

This present invention is a booster pack and a booster cable that eliminates the danger of reverse connections, shorts, fires, spark firing and battery explosion. The invention requires no separate switching mechanism to turn power on or power off. It also does not require the imperfect human judgment of any indication device to determine correct or incorrect connection.

The clamps detect for the correct polarity and automatically control the power. Power turns on once a good connection has been made. If user makes a wrong connection, there will be no power but its warning signal will go off. Once a clamp is dislodged from the battery terminal, it automatically turns power off without the need to deactivate a switch. This invention also provides safe and automatic power on/off control for the booster cable and booster pack.

BRIEF DESCRIPTION OF THE DRAWINGS

A detailed description of the embodiments of the invention will be made with reference to the accompanying drawings, wherein like numerals designate corresponding parts in figures.

FIG. 2a is a Diagram of the Top View of the Solenoid Assembly in Closed State

FIG. 2b is a Diagram of the Left View of the Solenoid Assembly in Closed State

FIG. 2c is a Diagram of the Front View of the Solenoid Assembly in Closed State

FIG. 2d is a Diagram of the Right View of the Solenoid Assembly in Closed State

FIG. 3a is a Diagram of the Top View of the Solenoid Assembly in Open State

FIG. 3b is a Diagram of the Left View of the Solenoid Assembly in Open State

FIG. 3c is a Diagram of the Front View of the Solenoid Assembly in Open State

FIG. 3d is a Diagram of the Right View of the Solenoid Assembly in Open State

DETAILED DESCRIPTION

I. Polarity Sensitive Booster Cable

A. Working Theory of the Polarity Sensitive Booster Cable

Figure 1:
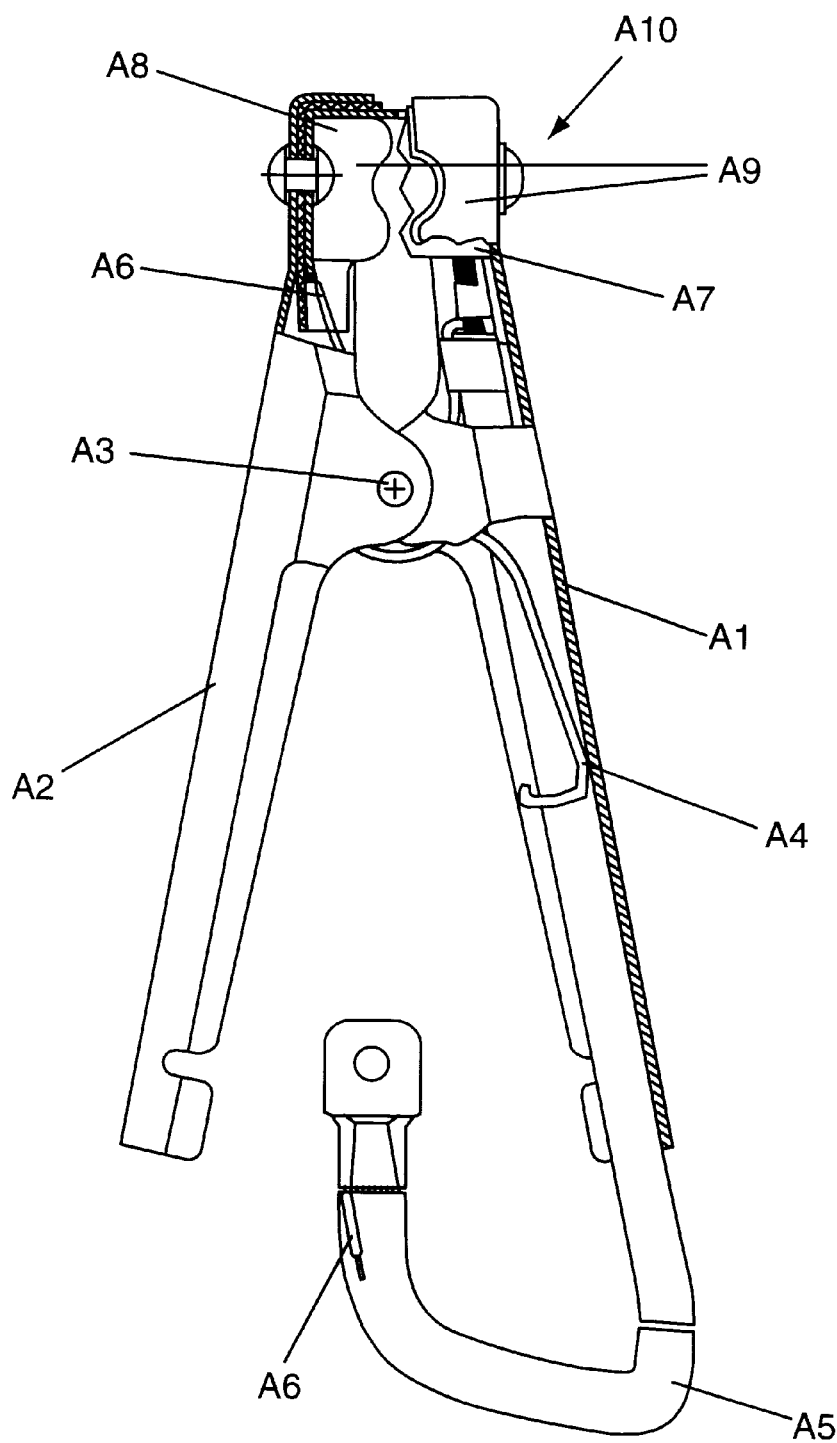
FIG. 1 is a Diagram of a Clamp
Figure 4:
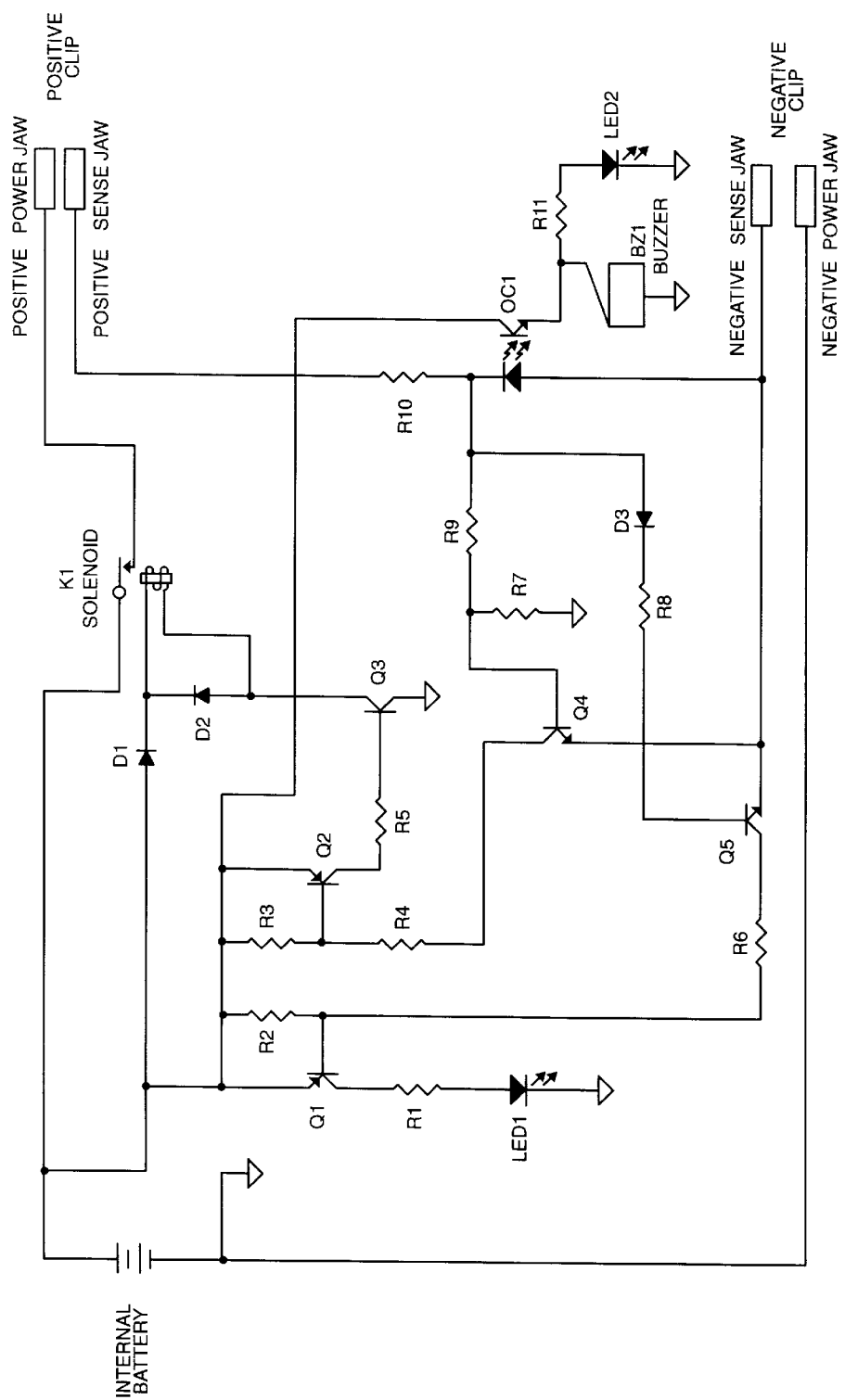
FIG. 4 is a Circuit Diagram of the Best Mode of the Polarity Sensitive Booster Pack
Figure 5:
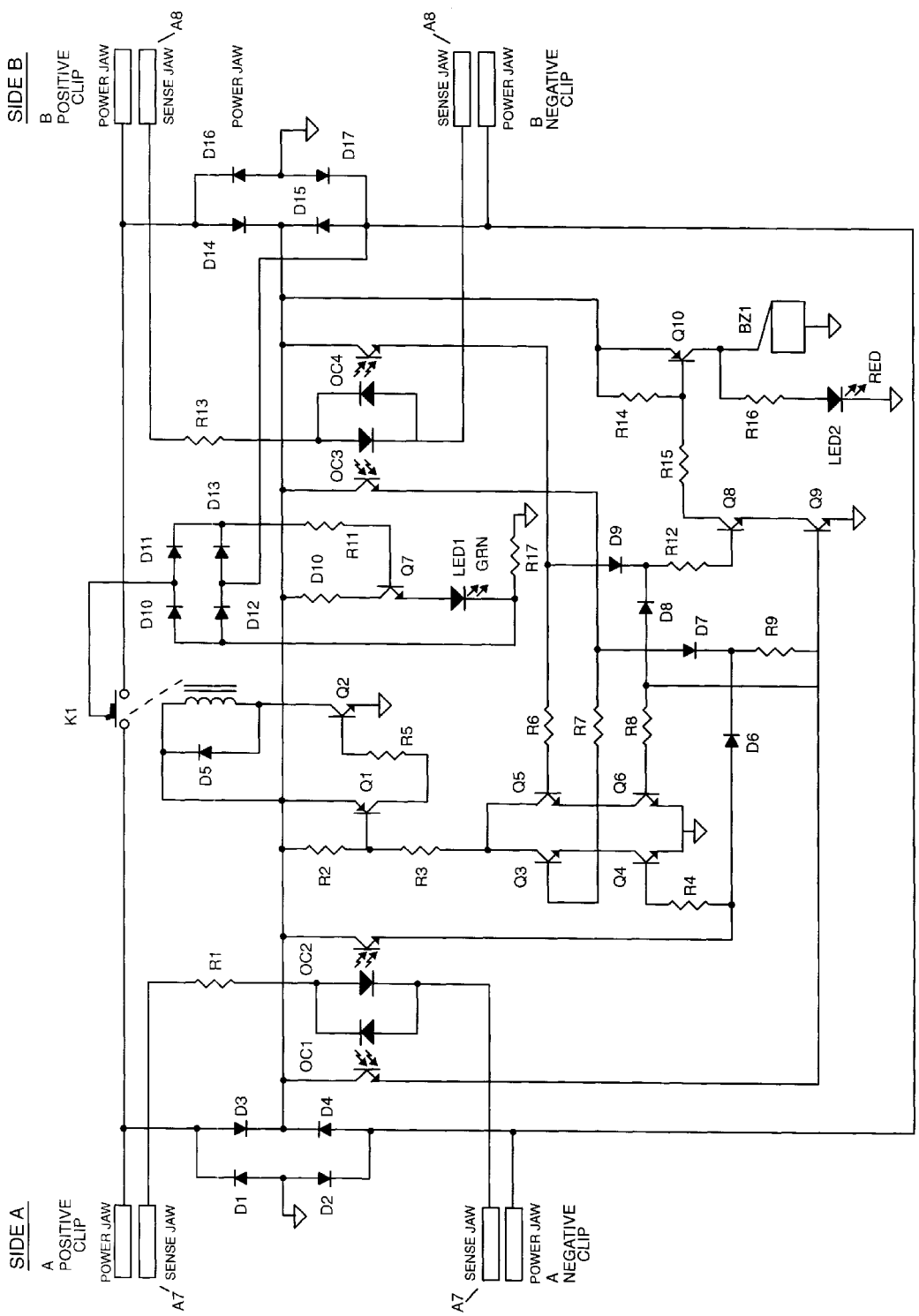
FIG. 5 is a Circuit Diagram of the Best Mode of the Polarity Sensitive Booster Cable
Figure 6A:
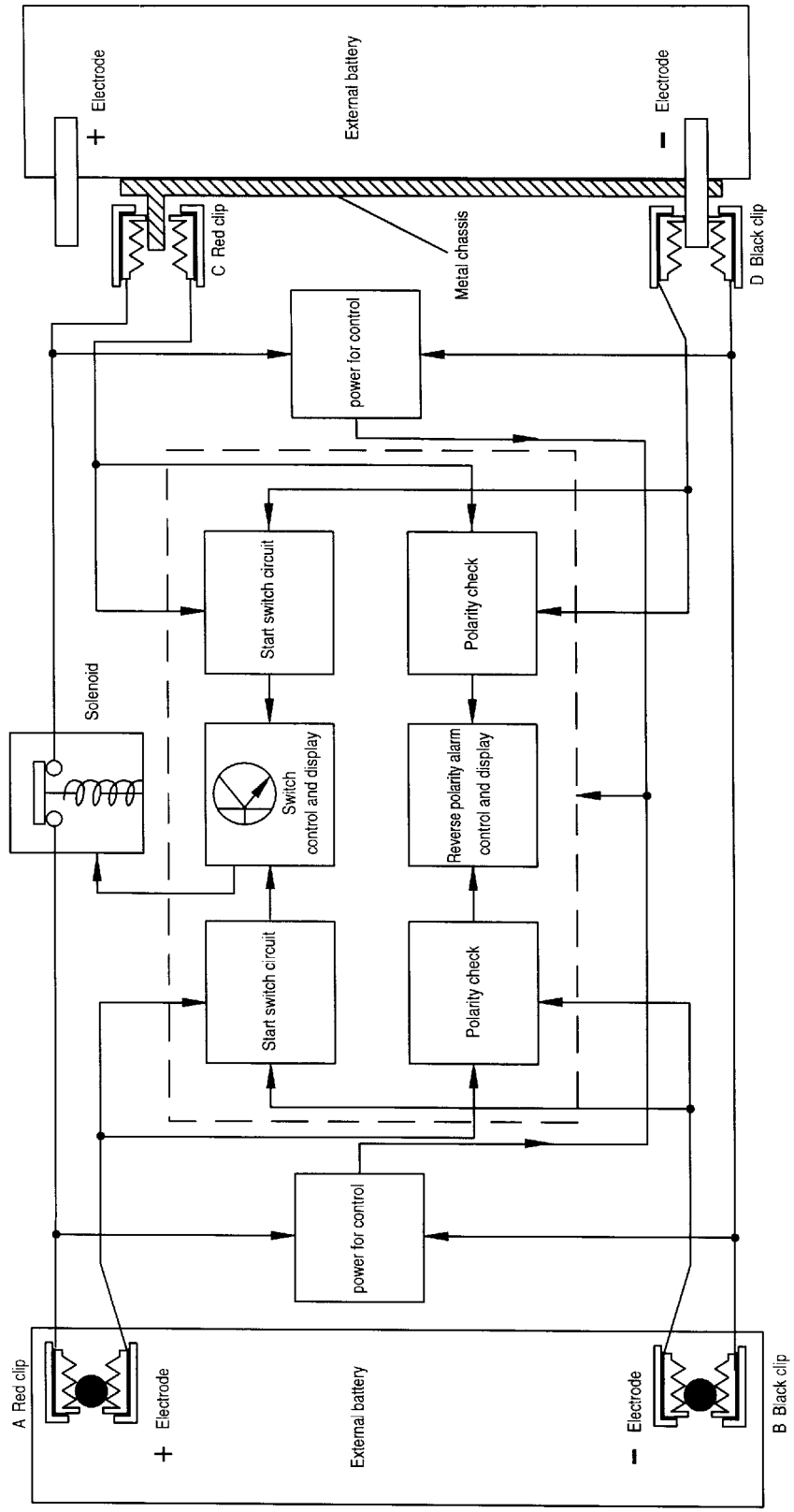
FIG. 6a is a Control Block Diagram of the Best Mode of the Booster Cable in Short Circuit State
Figure 6B:
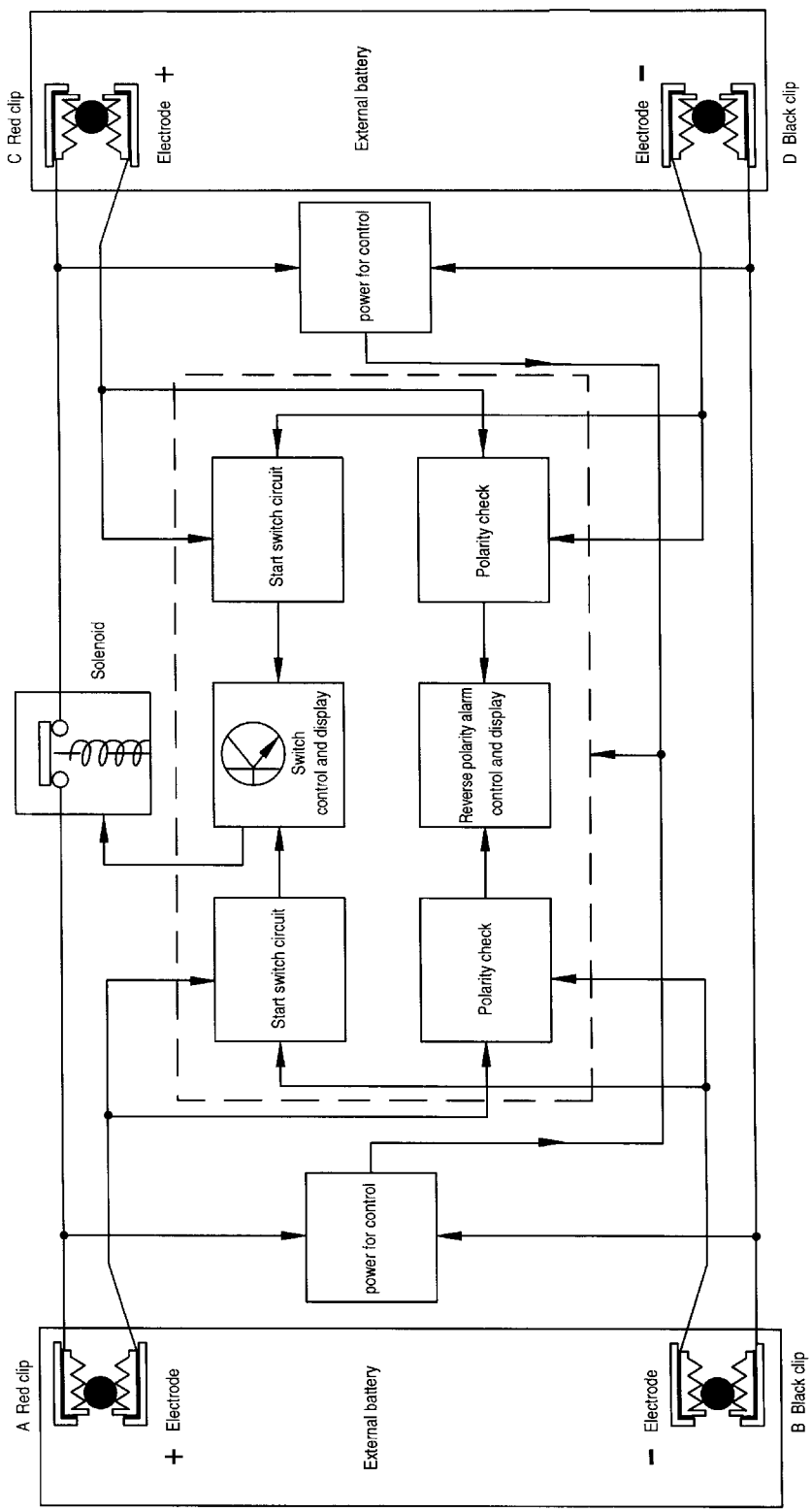
FIG. 6b is a Control Block Diagram of the Best Mode of the Booster Cable in the Normal Working State FIG. 6c Control Block Diagram of the Best Mode of the Booster Cable in the Natural State
Figure 6C:
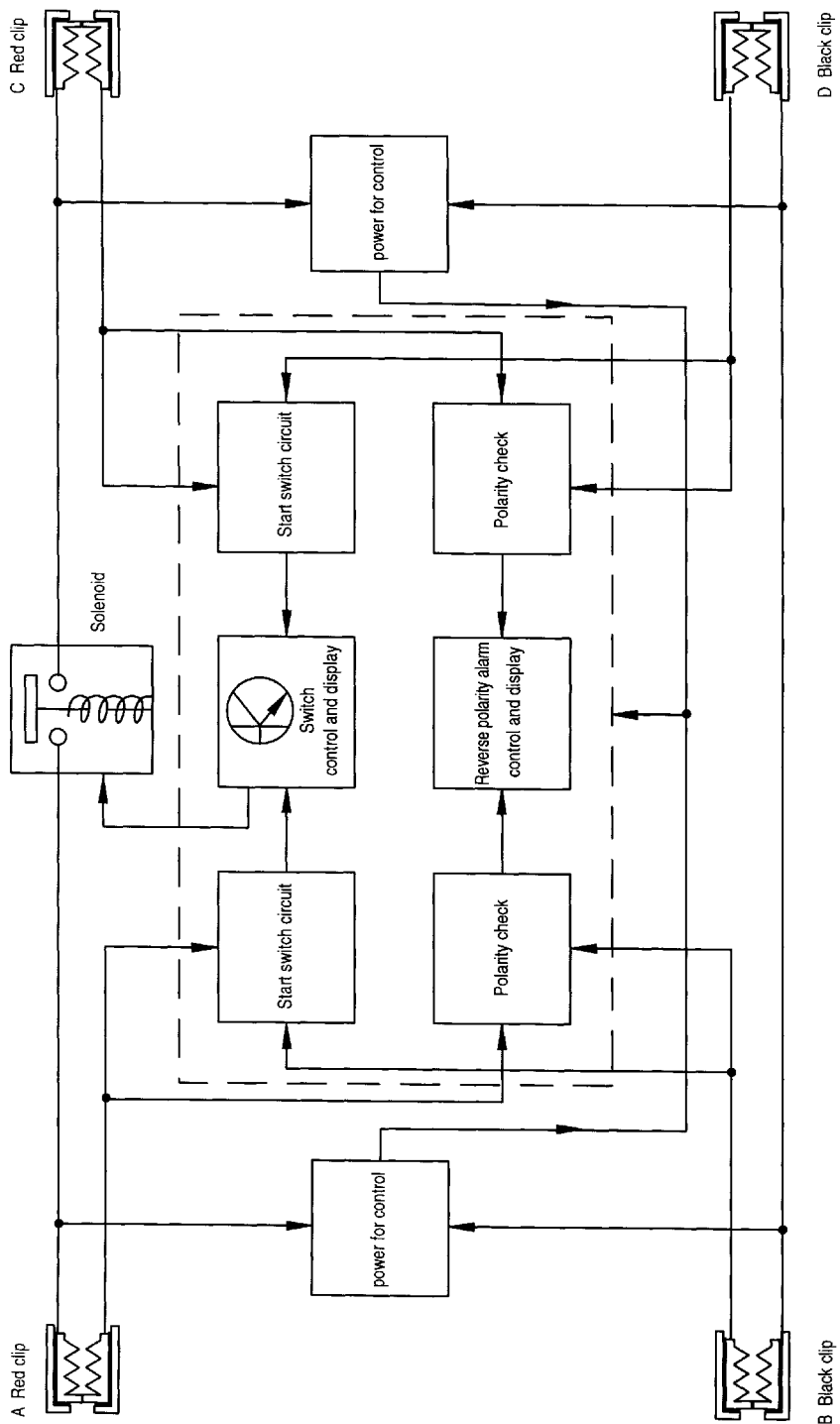
Figure 7A:
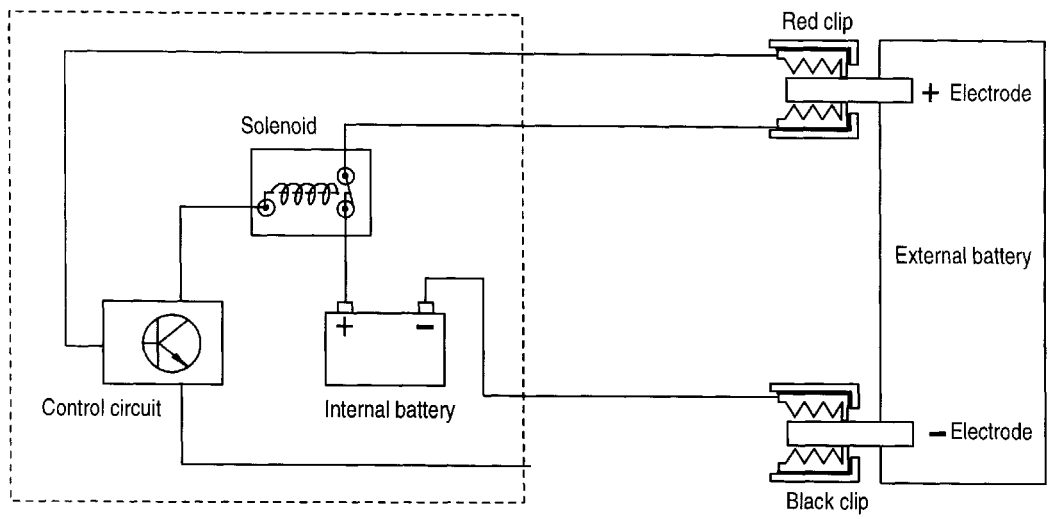
FIG. 7a is a Diagram of the Booster Pack in the Normal Working State
Figure 7B:
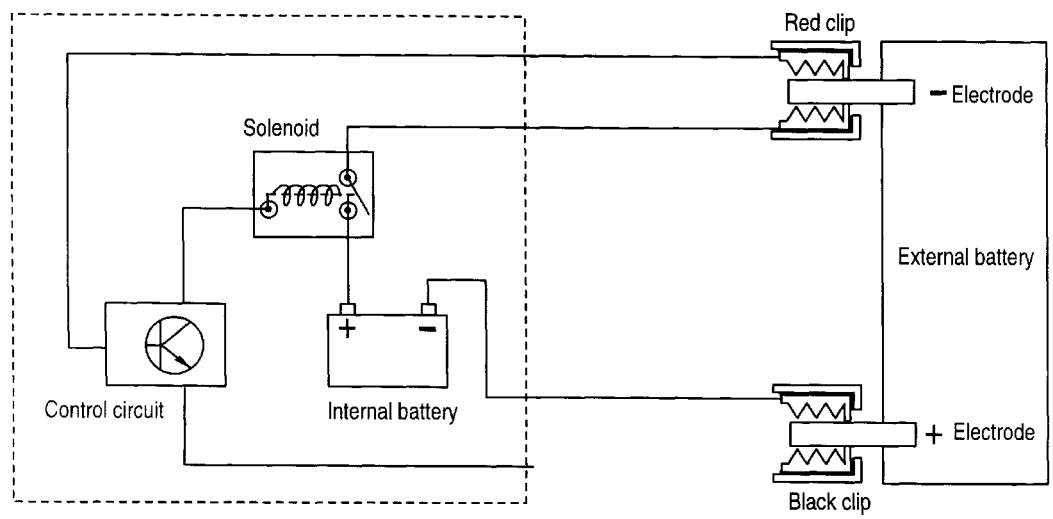
FIG. 7b is a Diagram of the Booster Pack in the Reverse Polarity State
Figure 7C:
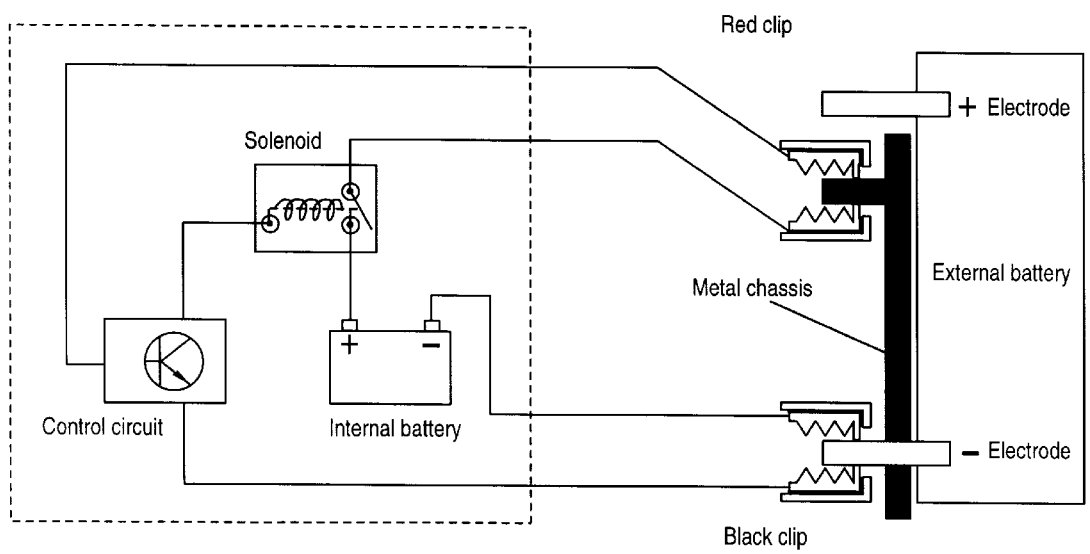
FIG. 7c is a Diagram of the Booster Pack in the Short Circuit State
Figure 8A:
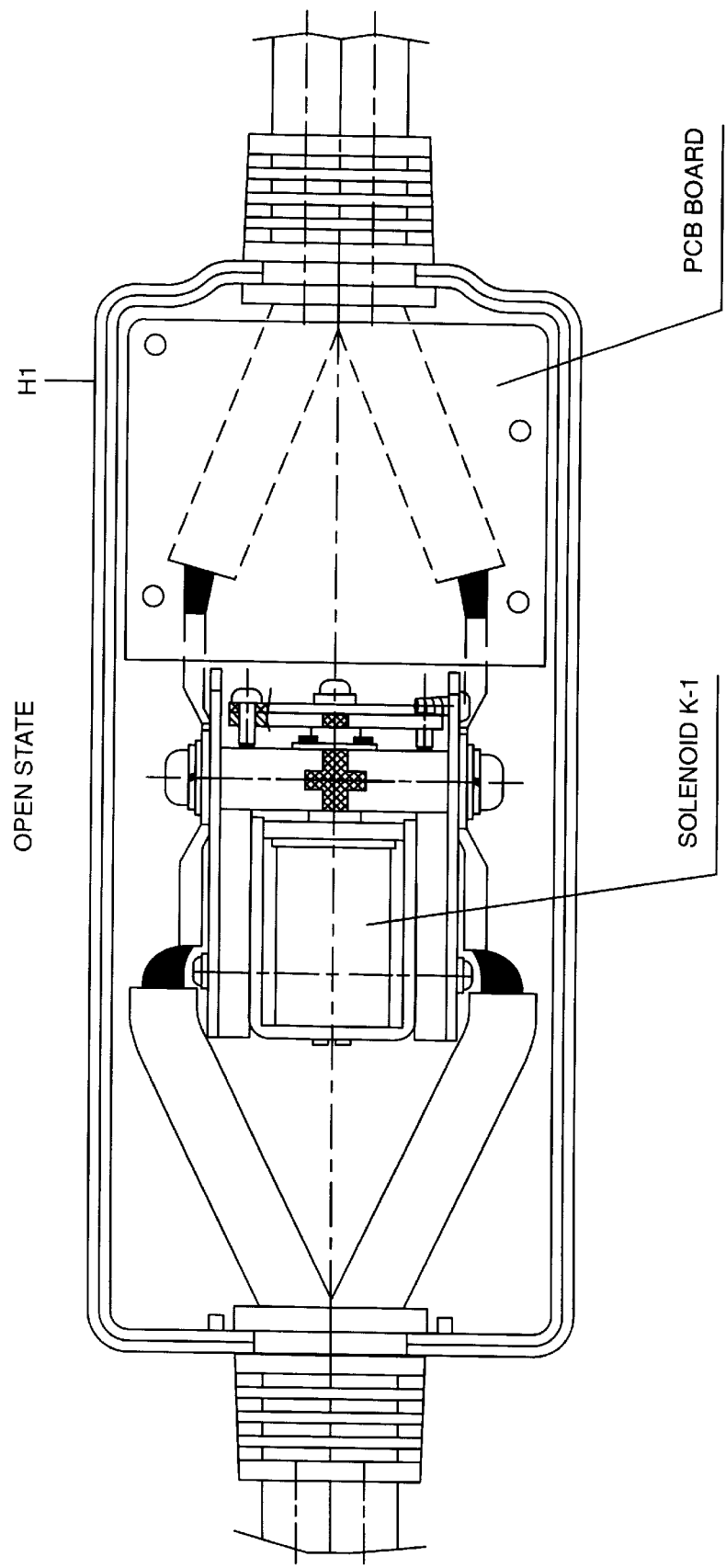
FIG. 8a is a Diagram of the Internal Construction of the Control Box for the Booster Cable where the Solenoid is in Open State
Figure 8B:
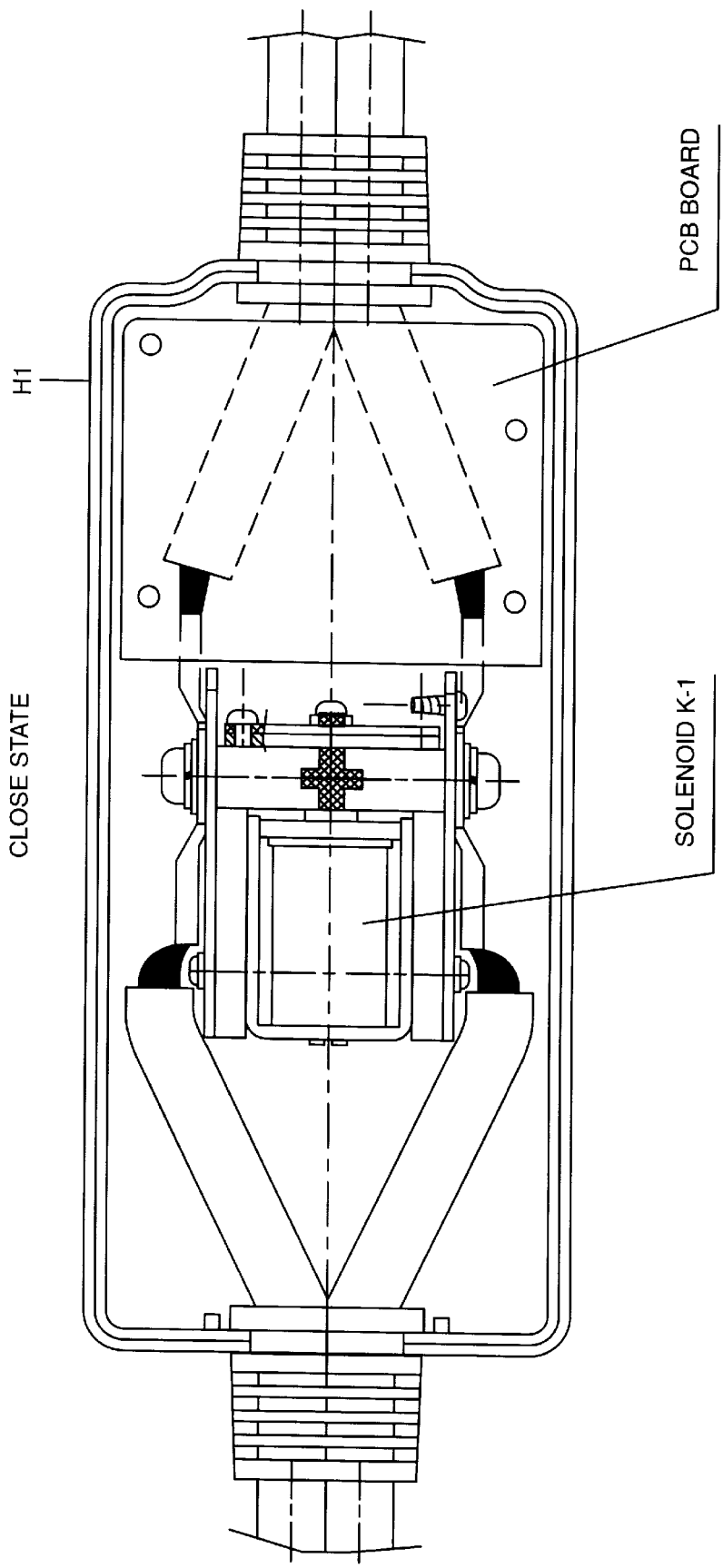
FIG. 8b is a Diagram of the Internal Construction of the Control Box for the Booster Cable where the Solenoid is in Closed State
Figure 8D:
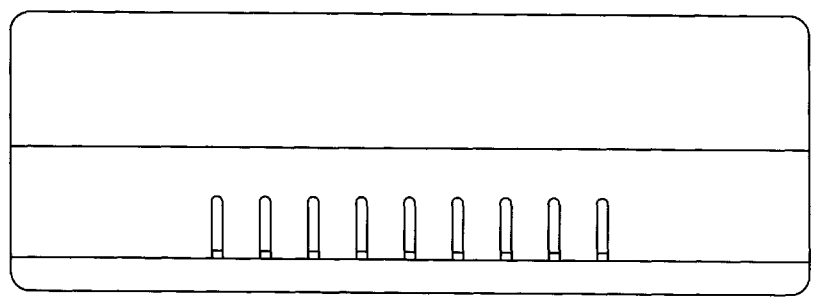
FIG. 8d is a Drawing of the Left View of the External Construction of the Control Box for the Booster Cable
Figures 8C, 8F:
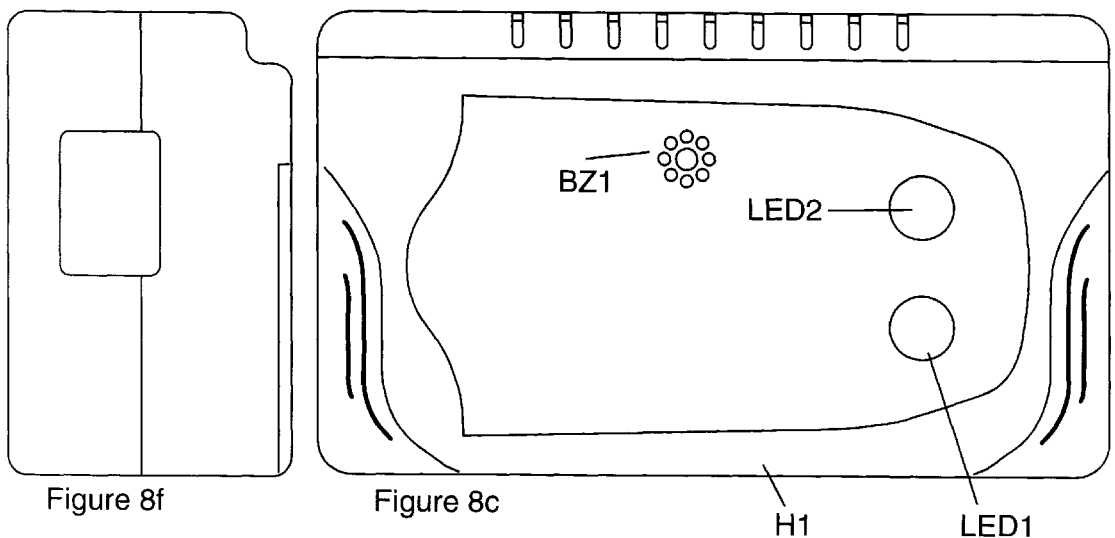
FIG. 8c is a Drawing of the Top View of the External Construction of the Control Box for the Booster Cable
FIG. 8f is a Drawing of the Front View of the External Construction of the Control Box for the Booster Cable
Figure 8E:
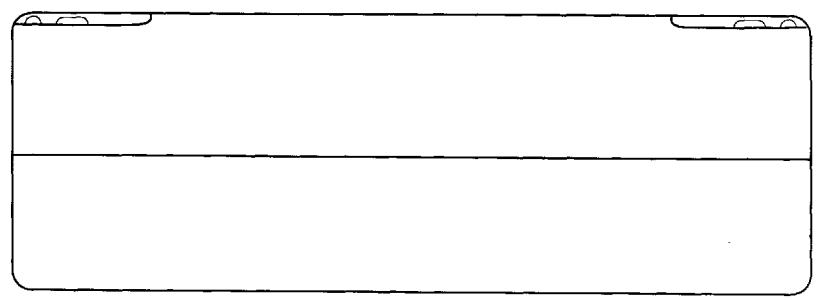
FIG. 8e is a Drawing of the Right View of the External Construction of the Control Box for the Booster Cable

Let's first look at the fundamental theory behind the special booster cable. Like a regular booster cable, the special booster cable in this invention has four sets of alligator clamps and each Clamp A10, as seen in FIG. 1, is connected to a power cable A5. These power cables are connected to a Control Box H1, which provides space to house a Solenoid Assembly K-1, as seen in FIG. 2a and a Control Circuit, as seen in FIGS. 5 and 6a. The Control Circuit receives and compares polarity signals from the signal wires connected to jaws at the clamps. Through the connected jaws and signal wires, the circuit receives signals from contacts with battery terminals. If the connection polarity is good, the control circuit will charge the solenoid assembly K-1. The charged Solenoid Assembly will provide a path for current power to flow through. If the polarity of connections is not good, the Control Circuit will not charge the Solenoid Assembly and no path is provided for power current. There is no spark generated at the jaws. Further, the circuit can turn on the Buzzer Signal BZ1 to alert user that a wrong connection has been made.

B. Details of the Polarity Sensitive Clamps

Let's now look at the details of the clamps A10 as seen in FIG. 1. The clamps look similar to any traditional clamp. This polarity sensitive clamp is comprised of two handles, A1 and A2. The heads of the two handles are each attached to one Jaw Fixture A7 and A8. The Jaw Fixtures A7 and A8 can be attached to the two handles A1 and A2 by insulated rivets, forming opposing jaws. Jaw A7 is connected to the power cable A5 and jaw A8 is connected to a signal wire A6. For convenience sake, Jaw A7 is referred to as the "Power Jaw", and jaw A8 is referred as the "Sense Jaw" or "Signal Jaw". A plastic cap placed between the Sense Jaw A8 and the handle A2 for insulation, while the opening of the cap exposes the jaw teeth for electric contact. The signal wire A6 is embedded inside power cable A5 but is insulated therefrom. The opposite end of power cable A5 is connected to a conductive hexagon post of a solenoid assembly further discussed below. The opposite end of signal wire A6 is connected to the electronic control circuit (see below for details). Handles A1 and A2 are held together by rivet pin A3 and spring A4. In the preferred embodiment, a rivet pin should be used as the inventor believes this is the best mode, though other means are possible. When handles A1 and A2 are squeezed, the jaw mouth of Power Jaw A7 and Sense Jaw A8 will open. There will be no contact between each other. As a result, even if power cable A5 carries electric current, signal wire A6 will not receive any volt signals from power cable A5.

C. Detailed Structure of the Solenoid Assembly

Let's now look at the details of the solenoid assembly, K-1 as seen in FIG. 2. A moving plunger B1 is placed inside the solenoid coil. The plunger B1 has the tail end exposed outside the solenoid housing. The tail of plunger B1 is attached to a flat shape conductive contact plate B2. The inventor believes that the flat shape of the conductive contact plate is the best mode, but also believes that other shapes of plates could also be substantially adequate. A spring, B3, sits between the conductive contact plate B2 and the solenoid coil housing and is inserted onto the plunger B1.

A pair of hexagon shape conductive posts, B4 and B5, which are insulated at the base, are sitting perpendicular to the plunger B1 and the spring B3, and between the contact plate B2 and the solenoid housing. One post B4 is connected to the power cable A5. The opposite post, B5 is connected to another power cable, which if used in a battery booster pack, is connected to a built-in battery, or, if used in a booster cable, is connected to the opposite end of the power cable A5. The two conductive posts B4 and B5 are aligned with their flat face parallel to the contact plate B2. This position provides for a larger contact surface area between the posts and the contact plate.

When the solenoid coil is charged, as in FIG. 2, it generates a magnetic force and induces the moving plunger B1 to move toward the inner end of the solenoid housing. The motion also pulls the contact plate B2 travelling in the same direction but was blocked by the two conductive posts B4 and B5. As a result, the magnetic force presses the contact plate B2 on the surface of B4 and B5, forming a path for electric current between these two posts. Through the two posts, power current can flow through this booster cable and offer jump-starting power to a discharged battery.

If the solenoid coil is not charged, as in FIG. 3, the spring B3 pushes the contact plate B2 away from the conductive posts, B4 and B5. There will be no path between the two posts and no power current will be flow through the posts. Since there are power cables connecting the battery terminals of opposite battery sources, the absence of path switches off the booster cable and there will be no spark at the jaws.

D. Control Circuit of the Booster Cable System

Now let's look at the detail structure of the control circuits of the booster cable, as seen in FIG. 5. The circuit controls two pairs of cables, each connected to one polarity sensitive clamp as explained above. Each pair is connected on one side of the control box H1. One pair of the cable is shorter in length. For purpose of convenience, this shorter cable is referred hereafter as the "A" side. The opposite pair of cable, the longer pair, is referred hereafter as the "B" side.

1. Good Connection Case

Assume that the user makes the first connection with the A side to a battery and further assume that it is a good connection. The positive clamp (also called a clip) is connected to the positive terminal and its negative clamp (also called a clip) is connected to the negative terminal. Current passes through diode D3 and powers the entire circuit group. It returns through diode D2 from the common path back to the battery source. When the user makes the second connection at the B side to a second battery source, voltage is applied at the Signal Jaw A7 of the positive clamp. Its current energizes resistor R1, optic coupler OC2 and returns to the battery source through the contact at the Signal Jaw at the negative clamp. Current lights up the internal light emitting diode within optic coupler OC2 and turns on the transistor section. Through the path provided by the transistor, current routes through resistor R4 and turns on the transistor Q4. At the same time the current branches through diode D6, resistor R9 and transistor Q9. Transistor Q9 is also turned on.

When transistors Q4 and Q9 are energized, the circuit group is in a stand-by condition. Yet, the solenoid K1 remains open and no path is provided for current flow between the two batteries.

If the second connection at the B side is correctly made, with the positive clamp on the positive terminal and the negative clamp to the negative terminal, voltage is applied at the Signal Jaw A8 in the positive clamp. Its current energizes resistor R13, optic coupler OC3 and returns to the battery source through the contact at the Signal Jaw A8 of the negative clamp. Current lights up the internal light emitting diode within optic coupler OC3 and turns on the transistor section. Current then flows through resistor R7 and the base prong of transistor Q3.

Since transistor Q4 is on, a path is therefore established so that transistor Q3 is energized. Current flows through resistor R2 and R3. The voltage potential across resistor R2 will bias the base prong of the transistor Q1. Transistor Q1 will be turned on. Current will flow through the collector prong of transistor Q1, resistor R5 and the base prong of transistor Q2. Transistor Q2 will be turned on.

Thus, current will flow through solenoid K1 and will energize its coil. Magnetic field around the solenoid induces motion of the plunger B1, shown in FIG. 2. The plunger forms a path between the two hexagonal posts. Voltage is applied across diode D11 in FIG. 5, resistor R11, transistor Q7, a light emitting diode LED1 and resistor R17. Transistor Q7 is fully turned on and current will turn on the light emitting diode LED1, advising user that the connections are good. Current will flow from a good battery to a low battery, which is usually in a stranded car.

After jump starting of the stranded car has been accomplished, the user disconnects one clamp on side A. Either one of the two Signal Jaws on side A is disconnected from the battery terminal which interrupts the path in optic coupler OC2. Or alternatively if the user disconnects one clamp on side B, one of the two Signal Jaws on side B is disconnected from the discharged battery terminal which interrupts the completed path in optic coupler OC3.

The above disconnection either shuts down the internal light emitting diode within optic coupler OC2 or OC3. As the internal light emitting diode is off, the transistor section will be turned off, removing the current on transistor Q3 or Q4. Since these transistors are connected in series, turning either one off will interrupt the entire flow path. Transistors Q3 and Q4 will be turned off, which in turn shut down transistors Q1 and Q2. Consequently, current to energize the coil winding of solenoid K1 is disconnected. The magnetic induction is terminated. The spring pushes the contact plate away from the two posts, and terminates the current path between the two batteries. Diode D5 is a safety precaution to protect transistor Q2 from a possible high voltage spike.

2. Reverse Connection Case

Let's now assume that the user makes a reverse connection. The positive clamp of side A is connected to the negative terminal of a battery and the negative clamp connected to the positive terminal of the same battery. Once connection is established, voltage is applied across the Signal Jaw in the positive clamp. Its current energizes resistor R1, optic coupler OC1 and returns to the battery source through the contact at the Signal Jaw of the negative clamp. Current lights up the internal light emitting diode within optic coupler OC1 and turns on the transistor section. Current then flows through resistor R8 and energizes transistor Q6. Current also branches through diode D8, resistor R12 and the transistor Q8. Therefore transistor Q8 is ready to be turned on and the circuit group is at standby condition.

Assuming at this point the User connects the positive clamp of side B to the positive terminal of another battery, and the negative clamp to the negative terminal of the same battery. Voltage is applied across the Signal Jaw in the positive clamp. Its current energizes resistor R13, optic coupler OC3 and returns to the battery source through the Signal Jaw of the negative clamp. Current will light up the internal light emitting diode within optic coupler OC3 and turn on the transistor section. Current continues to flow through resistor R7 to the base prong of transistor Q3. Since transistor Q4 and Q3 are connected in series and Q4 at this point is at off status, Q3 will remain at off status. Therefore, although transistor Q6 is on, transistor Q5 is at off status and no path is provided for current flow. Consequently, there is no power to drive transistor Q1 and it will keep transistor Q2 in off status.

With the transistors in off status, there is no current to energize the solenoid K1. The current path remains open and no current flow between the two batteries. Thus, the reverse connection does not cause any spark or any explosion.

Yet, when the current is flowed through resistor R7 to the base of transistor Q3, it also branches through diode D7, resistor R9 and the transistor Q9. Transistor Q8 will be biased on through resistor R12 via the collector-emitter junction of transistor Q9. As both transistors Q8 and Q9 are on, the base prong of the transistor Q10 will be pulled low through resistors R14 and R15. Transistor Q10 will be turned on. Current flows through to turn on the buzzer BZ1 and the light emitting diode LED2 for alarm purpose, advising user that a reverse connection has been made.

3. Double Reverse Connection Case

Let's now assume that the first connection at "A" side was made with the positive clamp connected to the negative terminal of the first battery source, and also the negative clamp connected to the positive terminal of the same battery. As a connection is established, voltage is applied through the Signal Jaw in the positive clamp, through resistor R1, optic coupler OC1 and the Signal Jaw in the negative clamp. Current energizes internal light emitting diode within optic coupler OC1, so the transistor section will be turned on. A path is formed so that current is flowed through resistor R8 to turn on transistor Q6. At the same time the current branches through diode D8, resistor R12 and the transistor Q8. Therefore transistor Q8 is ready to be turned on.

If at this time the positive clamp on the "B" side is connected to the negative terminal of a second battery source and the negative clamp to the positive terminal of the same battery. Voltage is applied across the contact formed by the Signal Jaw in the positive clamp, resistor R13, optic coupler OC4 and the contact formed by the Signal Jaw in the negative clamp. Current will flow through internal light emitting diode within optic coupler OC4 and light up it, the transistor section will be turned on. Current flows through resistor R6 to the base of transistor Q5. As transistor Q6 has been in "on" position, so the in series connected transistor Q5 is also turned on. A path is formed. Base of the transistor Q1 is pulled low through resistors R2 and R3. The voltage potential across resistor R2 will bias on the base of the transistor Q1. Therefore transistor Q1 will be turned on. Current will flow through the collector of transistor Q1, resistor R5 and the base of transistor Q2. In turn, transistor Q2 is on and current will charge the solenoid K1. Its magnetic field will induce the contact plate to form a path of current between the two batteries. Further, voltage is applied across diode D11, resistor R11, transistor Q7, light emitting diode LED1 and resistor R17. Transistor Q7 is fully on and current flow turns on the light emitting diode LED1. It advises user that a correct connection has been made, despite both connections were made reversed.

II. Battery Booster Pack

A. Working Theory of the Battery Booster Pack

Figure 9A:
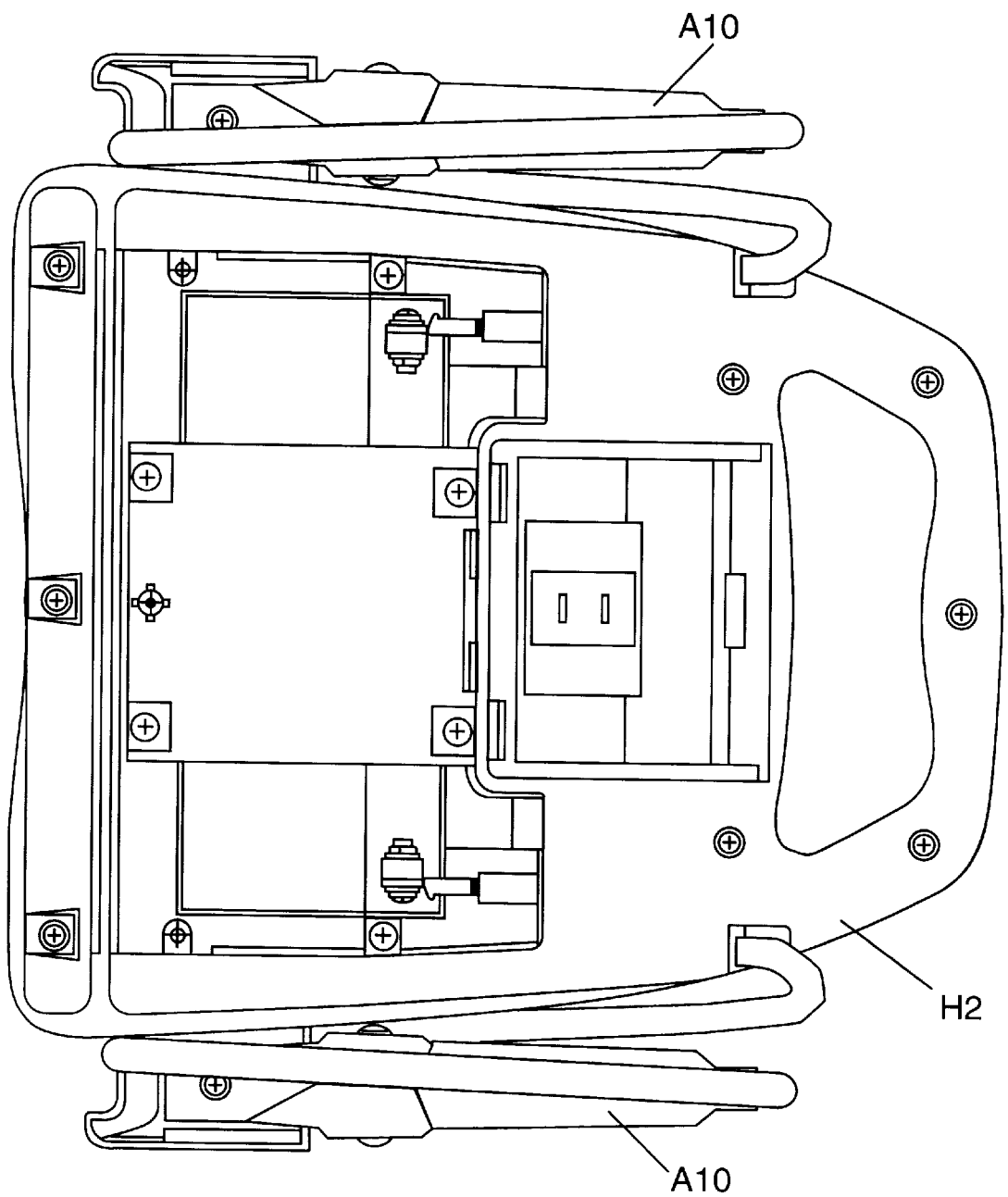
FIG. 9a is a Drawing of the Back View of the External Construction of the Housing for the Battery Booster Pack
Figure 9B:
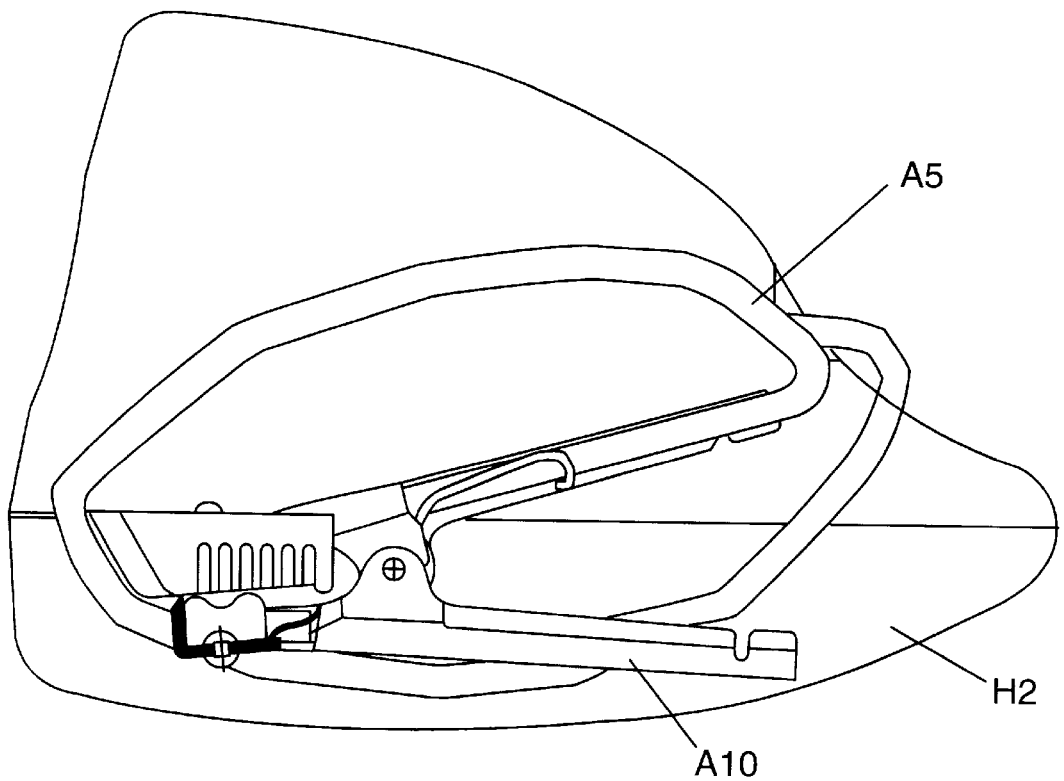
FIG. 9b is a Drawing of the Side View of the External Construction of the Housing for the Battery Booster Pack
Figure 9C:
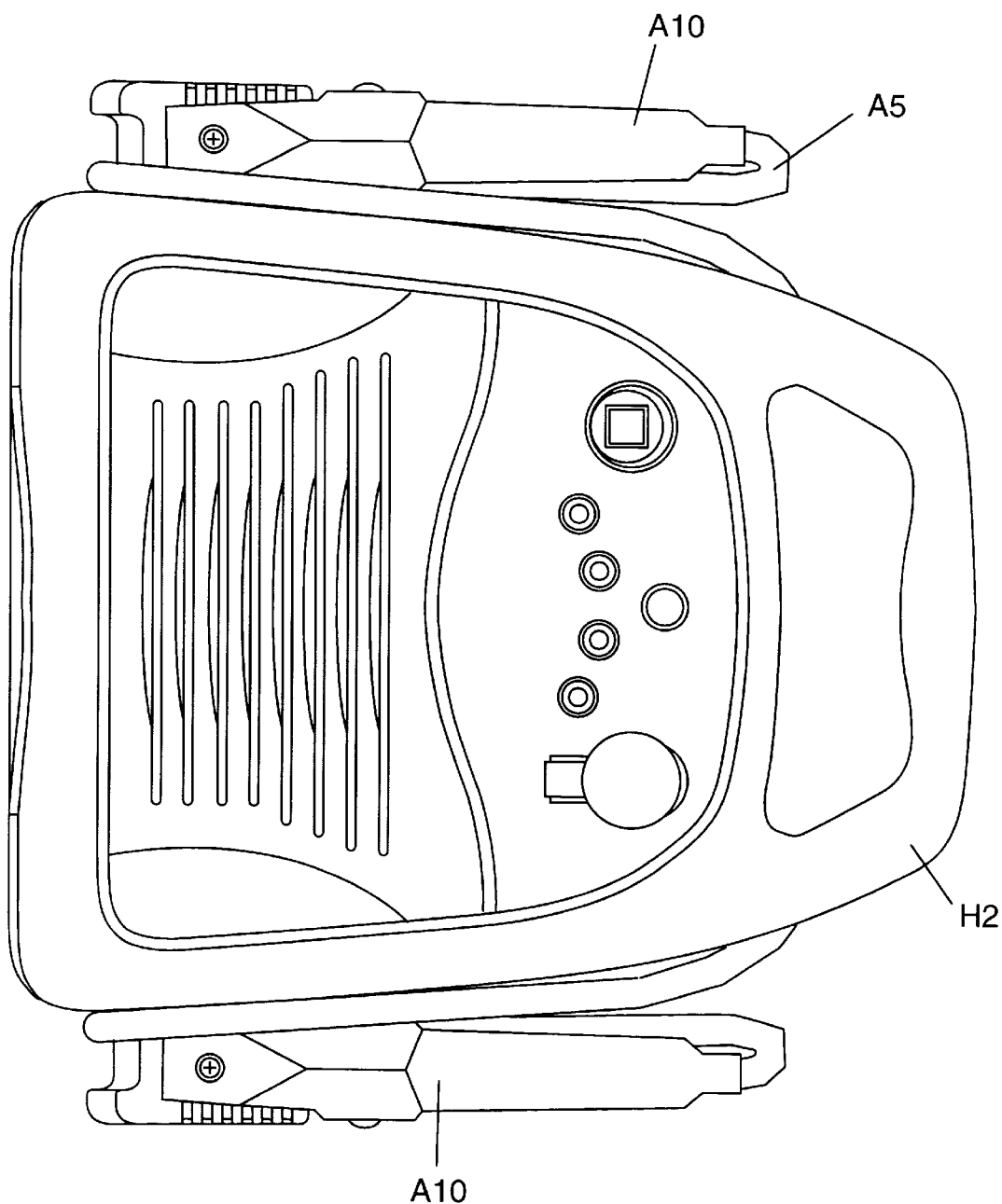
FIG. 9c is a Drawing of the Front View of the External Construction of the Housing for the Battery Booster Pack

Now let's look at the working theory of the battery booster pack as seen in FIGS. 9a–c. The booster pack is a portable device with a plastic housing H2. It provides for space to house a built-in battery, a solenoid assembly and a control circuit. It also has light emitting diodes to display the voltage level of the built-in battery. A built-in charger is housed in the charger compartment. User may insert an extension for recharge purpose. A separate light emitting diode will be turned on showing the built-in battery is being charged, once voltage is applied through the charger.

A female cigarette light receptacle is provided for 12 volt power source 91. The receptacle is connected to the built-in battery as a power bank.

A bi-color light emitting diodes, LED1 (green in color) and LED2 (red in color) provides for advice to user on the status of connection between the booster pack and the outside battery. A green light indicates a good connection. A red light indicates a wrong connection. When the red light is turned on due to a wrong connection, the built-in buzzer will also go off to warn the user.

This battery booster pack has three power cables. Only two are exposed to the outside of the plastic housing H2. The first exposed cable connects between one conductive post of the solenoid assembly (see above for details) and the red color coded clamp, referred as the "Positive Clamp". The second exposed cable connects between the negative terminal of the built-in battery and the black color coded clamp, referred as the "Negative Clamp". The third cable, hidden inside the plastic housing H2, connects between the positive terminal of the built-in battery and the opposite conductive post of the solenoid assembly (see above for details).

The said Positive Clamp and the Negative Clamp has same structure as clamps used in the above booster cable systems. Each is provided for a Power Jaw A7 and a Sense Jaw A8. Through the Sense Jaws, the control circuit determines whether connections to an outside battery is good. If it determines that a good connection has been made, it will charge the solenoid assembly and engage the path for power current at the contact plate. If the connection is not good, it will not engage the path but will turn on the alarm, with a red light LED2 and buzzer BZ1.

B. Booster Pack Control Circuit Details

Let's assume the user makes a good connection. One places the Positive Clamp on the positive terminal of an outside battery on a stranded vehicle, and one also connects the Negative Clamp to the negative terminal of the same discharged battery.

As this point, voltage is applied across the contact formed by the signal jaw in the positive clip, resistors R10, R9 and R7, and the contact formed by the signal jaw in the negative clip. Voltage potential across resistor R7 will bias on the base-emitter junction of transistor Q4. A path is formed. The base voltage potential of transistor Q2 is pulled down by resistors R3 and R4. Therefore transistor Q4 is turned on. The collector current will flow to the base terminal of transistor Q3 through resistor R5. Transistor Q3 is also be turned on.

Current flows through diode D1 to the coil winding of the solenoid K1 and energizes it. Once the solenoid is charged, induction force will engage the contact plate with the two metal hexagon posts to form a current path between the two. Power current flows through from the positive terminal of built-in battery, through the two conductive posts, to the positive terminal of the outside discharged battery, returns through the negative terminal of the discharged battery back, through the Negative Clamp to the built-in battery.

C. LED Operation

When the clamps are connected to the terminals of the discharged outside battery properly, voltage is applied across the contact formed by the signal jaw in the positive clip, resistors R10, diode D3 and resistor R8, and the base-emitter junction of transistor Q5, and the contact formed by the signal jaw in the negative clip. Voltage potential will bias on the transistor Q5 and will turn it on. A path can be formed where the base voltage potential of the transistor Q1 is pulled down by the resistors R2 and R6. Thus, transistor Q1 will turn on and the collector current will flow to the light emitting diode LED1 through the resistor R1. The green color light emitting diode LED1 will be on to indicate the status of ready to engage.

D. Disconnection

When the stranded vehicle is successfully jump-started, user will disconnect any one of the two clamps. The disconnection discontinues the connection formed by the signal jaw of the dislodged clamp, either the Positive Clamp or the Negative Clamp. Consequently, the control path from the contact formed by the signal jaw in the positive clip, resistors R10, R9 and R7, and the contact formed by the signal jaw in the negative clip is interrupted. Transistor Q4 will lose its bias voltage and will be turned off, removing the current driven on the transistor Q2.

As transistor Q2 is turned off, transistor Q3 is also turned off. Thus, there is no current to charge solenoid K1. The induction force is terminated and no magnetic induction is available to hold the contact plate to the two posts. The current path between the positive terminal of the built-in battery to the discharged battery is gone. The battery booster pack is switched off automatically simply by dislodging any clamps after jump starting a stranded vehicle.

E. Reverse Connection Case

Now let's assume the user makes a wrong connection. One lodges the Positive Clamp to the negative terminal of an outside discharged battery, and also the Negative Clamp to the positive terminal of the outside battery.

Voltage is applied across the contact formed by the signal jaw in the positive clip, resistor R10, optic coupler OC1 and the contact formed by the signal jaw in the negative clip. Current flows through internal light emitting diode within optic coupler OC1 and light it up, so the transistor section will be turned on. Current flow powers up buzzer BZ1 and goes through resistor R11 to turn on light emitting diode LED2 in red color for alarm purpose.

As the base-emitter junction of transistor Q4 is reversed biased, it remains in off position. The path can not be formed through resistors R3 and R4. Transistor Q2 has no biasing source and also be in the off state. The transistor Q3 is also in the off state. The solenoid K1 is not energized. Contact plate remains away from the two conductive posts and no path is provided for current between the two batteries.

Although a reverse connection has been made, there is no power on either clamp so that there is no spark to cause any dangerous explosion. As the base-emitter junction of transistor Q5 is reversed biased, it is off. The path can not be formed through resistors R2 and R6. Transistor Q1 has no biasing source to drive on so that it would be in off state; No current will flow to the light emitting diode LED1, so it is not lit up.

I claim:

1. A spark proof booster cable apparatus comprising:
a) a housing to house the components;
b) four clamps having opposing jaws of a power jaw and a signal jaw whereby the power jaw delivers power current and the signal jaw detects an independent polarity signal;
c) two pairs of power cables connecting each power jaw of the said four clamps to the control box;
d) two pairs of signal wires connecting each signal jaw of the said four clamps to the control box whereby the combination of a power cable and a signal cable at a jaw pair constitutes a booster cable;
e) a set of light emitting diodes connected to optic couplers oriented by an electronic control circuit means, that notify the user of connection status;
f) a solenoid assembly controlling the path of power current which is biased into open and closed position by induction generated by the electronic control circuit means;
g) a first electronic control circuit means to show that connections between a battery source at opposite ends of a booster cable have been correctly made;
h) a second electronic control circuit means to warn the user that connections between battery sources at opposite ends of the booster cables have been incorrectly made;
i) a third electronic control circuit means to cause power current to flow through said solenoid assembly if and only if connections between battery sources at all four points of contact at the opposite ends of the clamp and booster cable have been correctly made;
j) a fourth electronic control circuit means to terminate power current flow through said solenoid assembly if a connection between a booster cable to a battery terminal has been discontinued.

2. The invention of claim 1 further comprising:
k) an audio buzzer that can buzz whereby notifying of an improper connection; and wherein the first electronic control circuit means additionally utilizes the buzzer to show that connections between a battery source at opposite ends of a booster cable have been correctly made; and wherein the second electronic control circuit means additionally utilizes the buzzer to show that connections between a battery source at opposite ends of a booster cable have been incorrectly made.

3. A spark proof battery booster pack comprising:
a) a housing, forming a recess capable of receiving a battery;
b) two clamps having opposing jaws of a power jaw and a signal jaw whereby the power jaw delivers power current and the signal jaw detects an independent polarity signal;
c) a pair of power cables connecting each power jaw of the said two clamps to the control box;
d) a pair of signal wires connecting each signal jaw of the said four clamps to the control box whereby the combination of a power cable and a signal cable at a jaw pair constitutes a booster cable;
e) a set of light emitting diodes connected to optic couplers oriented by an electronic control circuit means, that notify the user of connection status;
l) a solenoid assembly controlling the path of power current which is biased into open and closed position by induction generated by the electronic control circuit means;
m) a first electronic control circuit means to show that connections between a battery in the housing and an outside battery to be charged have been correctly made;
n) a first electronic control circuit means to show that connections between a battery in the housing and an outside battery to be charged have been incorrectly made;
o) a third electronic control circuit means to cause power current to flow through said solenoid assembly if and only if the battery source in the housing has been correctly connected to the outside battery by the clamp and booster cables;
p) a fourth electronic control circuit means to terminate power current flow through said solenoid assembly upon discontinuation of a connection between the clamps and a battery being boosted.

4. A spark proof battery booster pack as in claim 3 further comprising:
q) an audio buzzer that can buzz whereby notifying of an improper connection; and wherein the first electronic control circuit means additionally utilizes the buzzer to show a proper connection; and wherein the second electronic control circuit means additionally utilizes the buzzer to show an improper connection.

5. A spark proof battery booster pack as in claim 3 further comprising:
r) a female cigarette plug receptacle connected to the battery stored inside the housing, whereby allowing charging of the internal battery, testing of the internal battery or drawing of current from the internal battery.

6. A spark proof battery booster pack as in claim 3 further comprising:
s) a voltage level indicator of the said built-in battery whereby allowing the user to determine the voltage of the battery.

7. A spark proof battery booster pack as in claim 6 further comprising:
t) a charger to recharge the battery stored inside the housing;
u) an indicator to show the said built-in battery is being charged.

8. A magnetically controlled switching device comprising:
a) a plurality of polarity sensitive alligator clamps having clamp jaws;
b) a means for providing a path of electric current through one of the clamp jaws;
c) a means for detection of polarity signals through the opposite clamp jaw;
d) a solenoid inductive coil placed inside a housing;
e) a moving plunger inserted inside the annular center of the solenoid coil;
f) two conductive posts, insulated from each other, placed outside the solenoid housing;
g) a conductive contact plate, placed outside the said solenoid housing but attached to the end of the said moving plunger;
h) a spring, inserted through the body of the plunger and positioned between the contact plate and the solenoid housing;
i) a set of power cables connected between battery source and the said conductive posts;
j) a means for reading and comparing polarity at connections between this subject switch device to two battery sources;
k) a first responsive means to cause the said solenoid coil to be electrically charged when it reads that the said polarity signals are of the same polarity;
l) a second responsive means for sending out a warning signal when it reads the said signals are of the opposite polarities;

m) a third responsive means for terminating the charge of the said solenoid coil when it reads that the polarity signal is no longer present;

n) a fourth responsive means to engage contacts between the said contact plate and the said posts when the said solenoid coil is charged;

o) a fifth responsive means to disengage contacts between the said contact plate and the said posts when the said solenoid coil is not charged.

* * * * *